United States Patent
Ogiyama

(10) Patent No.: US 8,035,505 B2
(45) Date of Patent: Oct. 11, 2011

(54) MONITOR CONTROL SYSTEM

(75) Inventor: Teppei Ogiyama, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 871 days.

(21) Appl. No.: 11/905,819

(22) Filed: Oct. 4, 2007

(65) Prior Publication Data

US 2008/0088430 A1   Apr. 17, 2008

(30) Foreign Application Priority Data

Oct. 12, 2006   (JP) ................... 2006-278712

(51) Int. Cl.
*G08B 29/00* (2006.01)
(52) U.S. Cl. ...................... 340/506; 340/501
(58) Field of Classification Search ........... 340/500, 340/501, 506, 540, 541, 545.1
See application file for complete search history.

(56) References Cited

U.S. PATENT DOCUMENTS

| | | | | |
|---|---|---|---|---|
| 4,737,847 | A * | 4/1988 | Araki et al. | 348/161 |
| 6,353,385 | B1 * | 3/2002 | Molini et al. | 340/506 |
| 7,352,279 | B2 * | 4/2008 | Yu et al. | 340/517 |
| 2002/0012011 | A1 * | 1/2002 | Roytman et al. | 345/736 |
| 2004/0008111 | A1 * | 1/2004 | Chernoguzov et al. | 340/506 |
| 2004/0100374 | A1 * | 5/2004 | Menard et al. | 340/506 |
| 2006/0273892 | A1 * | 12/2006 | Okada et al. | 340/506 |

FOREIGN PATENT DOCUMENTS

| | | |
|---|---|---|
| JP | 61-163402 A | 7/1986 |
| JP | 63-052298 | 3/1988 |
| JP | 7114307 A | 5/1995 |
| JP | 2006-079311 A | 3/2006 |

OTHER PUBLICATIONS

Official Action in counterpart Japanese Patent Application dated Oct. 19, 2010.

* cited by examiner

*Primary Examiner* — Travis Hunnings
(74) *Attorney, Agent, or Firm* — Buchanan Ingersoll & Rooney PC

(57) ABSTRACT

In a monitor control system, an HMI (11 in FIG. 1) includes event list display means (16) for displaying an event list screen of list form, in which event names and alarm levels are contained as to faults and the like alarm events occurring in an object to-be-monitored (13), and storage means (17) for storing therein an alarm level table in which the alarm levels are set so as to correspond to time zones. When the alarm event occurs in the object to-be-monitored (13), the event list display means (16) determines the alarm level corresponding to the time zone in which an alarm event occurrence time is contained, on the basis of the alarm level table, so as to display the alarm level on the event list screen. Since the alarm level is changed depending upon the occurrence time, all alarm events can be recorded with unnecessary alarm events suppressed.

2 Claims, 3 Drawing Sheets

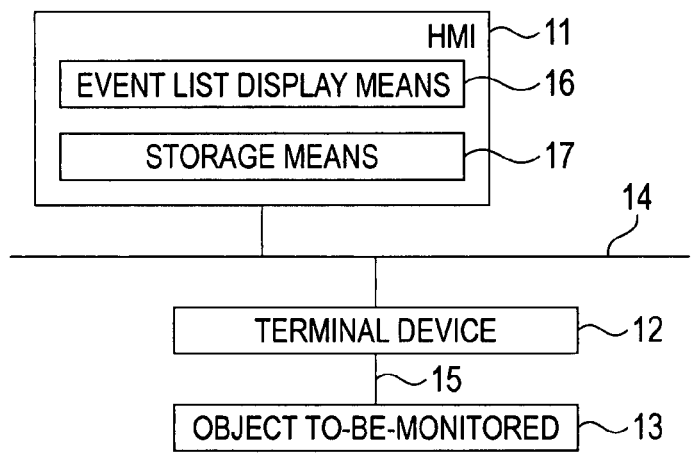

MONITOR CONTROL SYSTEM

BACKGROUND OF THE INVENTION

1. Field of the Invention

This invention relates to a monitor control system which is installed in a plant or the like where an object to-be-monitored such as a substation exists, and in which the alarm events of faults etc. having occurred in the object to-be-monitored are displayed on an HMI (Human Machine Interface).

2. Description of the Related Art

A prior-art monitor control system having been extensively used is such that, when the alarm event of a fault or the like occurs in an object to-be-monitored, the object to-be-monitored transmits the alarm event to an HMI, and that the HMI retains the name and event occurrence time of the received alarm event in a list form and permits an operator to confirm the contents thereof on an event list screen.

Also, there has been extensively used a system wherein an alarm level is set every alarm event beforehand, and upon receiving the alarm event, the HMI affixes the set alarm level to the name and occurrence time of the alarm event and then retains them in the list form.

Besides, there has been a monitor system wherein events having occurred in the object to-be-monitored are handled as the alarm events, only in a certain predetermined time zone, and the alarm events are suppressed in any other time zone, whereby the object to-be-monitored can be monitored only on the necessary occasion. In, for example, a system stated in Patent Document 1 (JP-A-63-52298, pages 2-4 and FIG. 1), the mask data of individual time zones are prepared for each of a plurality of monitor point sensors beforehand, and when the monitor point sensor operates, the mask data is selected in accordance with the time of the operation, so as to decide if the operation of the monitor point sensor is regarded as the alarm event, in accordance with the selected mask data, whereby at the operation of each monitor point sensor, the alarm event is generated only in the certain time zone.

In the prior-art monitor control system, the alarm level is set every alarm event beforehand. Therefore, even the alarm event whose degree of importance changes depending upon time zones, for example, a "door open" event which signifies that the door of the plant to-be-monitored has opened, is handled as the same alarm level in all the time zones. This has posed the problem that the alarm event which is essentially unnecessary is displayed.

Besides, in the system as stated in Patent Document 1, wherein the event having occurred in the object to-be-monitored is handled as the alarm event, only in the certain time zone, and the alarm event is suppressed in any other time zone, the alarm event itself is not generated during the suppression. Accordingly, there has been the problem that, although the object to-be-monitored has fallen into a state where an alarm is to be generated, this fact does not remain in a record at all.

SUMMARY OF THE INVENTION

This invention has been made in order to solve the problems as mentioned above, and has for its object to obtain a monitor control system in which, when the alarm event of a fault or the like occurs in an object to-be-monitored, it is displayed with its alarm level changed depending upon its occurrence time, whereby all alarm events can be recorded with unnecessary alarm events suppressed.

A monitor control system according to this invention includes a human machine interface that includes event list display means for displaying an event list screen of list form, in which event names and alarm levels are contained as to alarm events having occurred in an object to-be-monitored, and storage means for storing therein an alarm level table in which the alarm levels are set so as to correspond to time zones where the alarm events occur. Here, when the alarm event occurs in the object to-be-monitored, the event list display means determines the alarm level corresponding to the time zone in which an occurrence time of the alarm event is contained, on the basis of the alarm level table, so as to display the determined alarm level on the event list screen.

According to this invention, as described above, the monitor control system includes the human machine interface that includes the event list display means for displaying the event list screen of list form, in which the event names and the alarm levels are contained as to the alarm events having occurred in the object to-be-monitored, and the storage means for storing therein the alarm level table in which the alarm levels are set so as to correspond to the time zones where the alarm events occur. Here, when the alarm event occurs in the object to-be-monitored, the event list display means determines the alarm level corresponding to the time zone in which the occurrence time of the alarm event is contained, on the basis of the alarm level table, so as to display the determined alarm level on the event list screen. Therefore, the alarm level which is changed depending upon the occurrence time of the alarm event can be displayed on the screen.

The foregoing and other objects, features, aspects and advantages of this invention will become more apparent from the following detailed description of this invention when taken in conjunction with the accompanying drawings.

BRIEF DESCRIPTION OF THE DRAWINGS

FIG. 1 is a block diagram showing a monitor control system according to Embodiment 1 of this invention;

FIG. 2 is a diagram showing a screen example of an event list which is displayed by the HMI of the monitor control system according to Embodiment 1 of this invention;

FIG. 3 is a diagram showing an alarm level table in the monitor control system according to Embodiment 1 of this invention;

DESCRIPTION OF THE PREFERRED EMBODIMENTS

Embodiment 1

Figure 4:
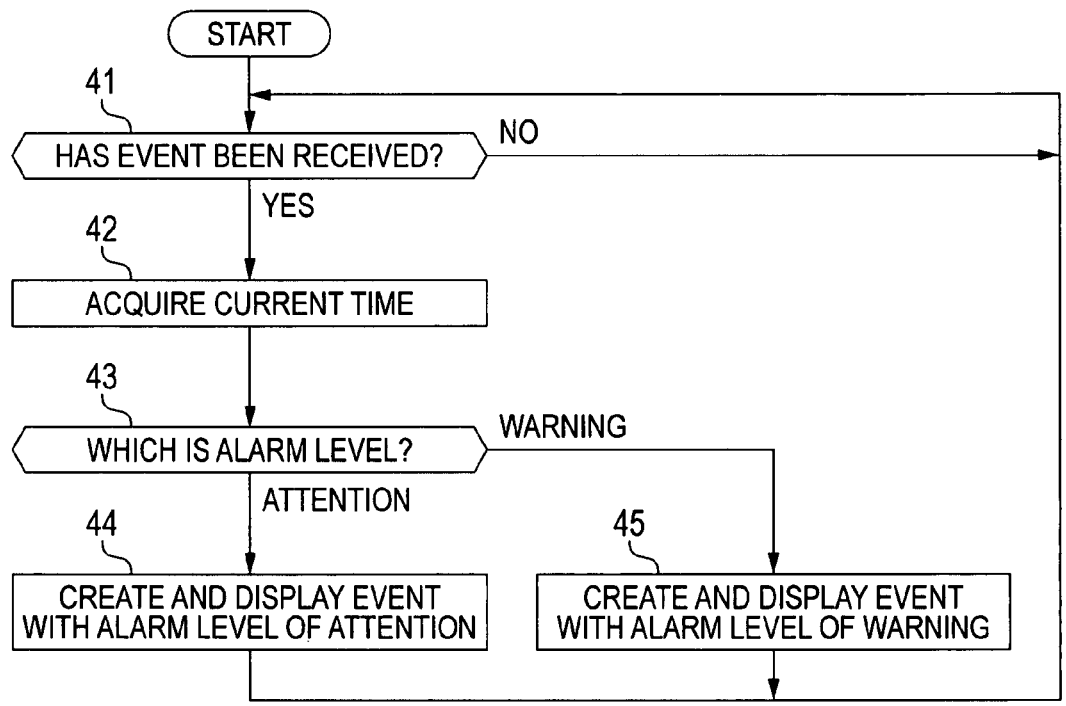
FIG. 4 is a flowchart showing the operation of the monitor control system according to Embodiment 1 of this invention.

FIG. 1 is a block diagram showing a monitor control system according to Embodiment 1 of this invention.

Referring to FIG. 1, an HMI 11 is built of a general computer which includes a clock function therein, and it displays the contents of alarm events which have occurred in an object to-be-monitored 13. A terminal device 12 is connected with the object to-be-monitored 13 by a hard wire 15 so as to receive the alarm signals of faults etc. having occurred in the object to-be-monitored 13. The terminal device 12 and the HMI 11 are connected by a LAN 14.

The HMI 11 includes event list display means 16 for displaying an event list screen (refer to FIG. 2) in which event names and alarm levels are indicated in a list form, and storage means 17 for storing therein an alarm level table (refer to FIG. 3) in which time zones and the alarm levels are associated.

The alarm signal of the fault or the like having occurred in the object to-be-monitored 13 is transmitted to the terminal device 12 as an electric signal, and it is converted into the alarm event by the terminal device 12. The alarm event is transmitted to the HMI 11 as data on the LAN 14. When the HMI 11 receives the alarm event, it generates an event message in accordance with a procedure to be stated later, and it displays the event message on the event list screen 21 in FIG. 2.

FIG. 2 is a diagram showing the event list screen which is displayed by the HMI of the monitor control system according to Embodiment 1 of this invention.

Referring to FIG. 2, the event list screen 21 is configured so as to indicate an event occurrence time, the event name, the alarm level, and an operation (occurrence and reset).

FIG. 3 is a diagram showing the alarm level table in the monitor control system according to Embodiment 1 of this invention.

Referring to FIG. 3, the alarm level table 31 is configured so as to associate the occurrence time and alarm level of the alarm event, and it indicates the time zone of attention and the time zone of warning every event name. The alarm level table 31 in FIG. 3 is held in the storage means 17 of the HMI 11.

FIG. 4 is a flowchart showing the operation of the monitor control system according to Embodiment 1 of this invention.

Next, the operation of the monitor control system will be described in conjunction with the flow chart of FIG. 4. The operation is performed by the event list display means 16.

The HMI 11 waits for an alarm event from the terminal device 12, at a step 41. Upon receiving the alarm event, the HMI 11 acquires the current time by referring to an internal clock, at a step 42.

Subsequently, at a step 43, the HMI 11 judges the alarm level of the received event at the current time, by referring to the alarm level table 31 on the basis of the name of the received alarm event and the acquired current time. All the alarm events which can occur in the object to-be-monitored 13, with one event at one line, are registered in the alarm level table 31. Besides, the time zone in which the corresponding alarm event is handled as an "attention" level, and the time zone in which the corresponding alarm event is handled as a "warning" level, are set for the respective alarm events beforehand.

More specifically, upon receiving the alarm event, the HMI 11 first searches the alarm level table 31 for the name of the received alarm event and subsequently compares the acquired current time with the time zone of the "attention" level or the "warning" level, so as to judge the alarm level of the received alarm event as one of the alarm event having generated the alarm level on a side on which the time zone containing the current time is set. In a case, for example, where a "door open" event was received at 20:00, the alarm level of this event becomes the "warning".

The setting of the time zone is expressed by the 24-hour system. Besides, the time zones shall not overlap between the "attention" level and the "warning" level, and any time zone which corresponds to neither the "attention" level nor the "warning" level shall not exist.

Subsequently, at a step 44 or 45, the HMI 11 creates an event message with the judged alarm level (attention or warning) and displays the event message on the event list screen 21.

In this manner, according to Embodiment 1, when the alarm event occurs, its alarm level which is changed depending upon the occurrence time of the alarm event is displayed on the screen. It is therefore possible to realize, for example, the operation that the "door open" event is displayed as the "attention" level in the daytime time zone during which an operator is present at the job site, whereas it is displayed as the "warning" level in the nighttime during which any operator is not present at the job site. Accordingly, while all the alarms having occurred in the object to-be-monitored are recorded, the events which are not especially important depending upon the time zones can be displayed as the "attention" level.

Embodiment 2

Figure 5:
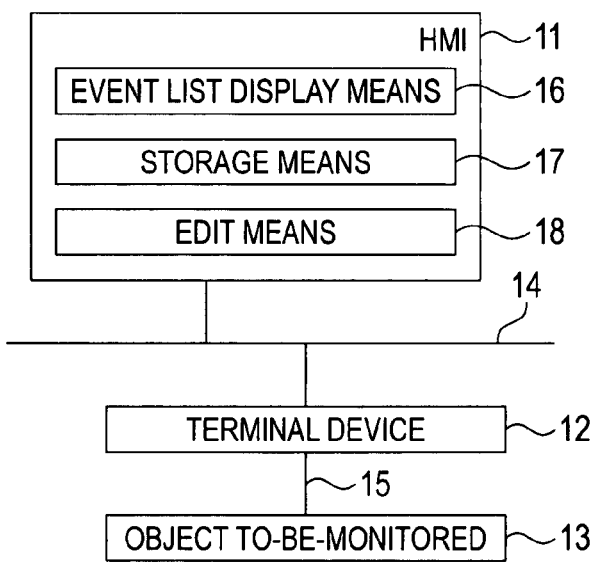
FIG. 5 is a block diagram showing a monitor control system according to Embodiment 2 of this invention.

FIG. 5 is a block diagram showing a monitor control system according to Embodiment 2 of this invention.

Referring to FIG. 5, numerals 11-17 designate the same constituents as in FIG. 1, respectively. In FIG. 5, edit means 18 is connected to the HMI 11, so that the contents of the alarm level table 31 in FIG. 3 can be edited.

In Embodiment 1, the contents of the alarm level table 31 have been set beforehand. In contrast, in Embodiment 2, the HMI 11 is provided with dialog means or the like for editing the content of the alarm level table 31, and the content of the alarm level table 31 can be altered at any desired timing.

In this way, according to Embodiment 2, it is possible to realize, for example, the operation that an alarm event which is always handled as a "warning" level during an ordinary service is handled as an "attention" level only when the maintenance of the object to-be-monitored 13 is performed.

That is, the content of the alarm level table can be altered at any desired timing, and the alarm level can be altered only in a time zone during which the maintenance or the like is performed in the object to-be-monitored.

Embodiment 3

Figure 6:
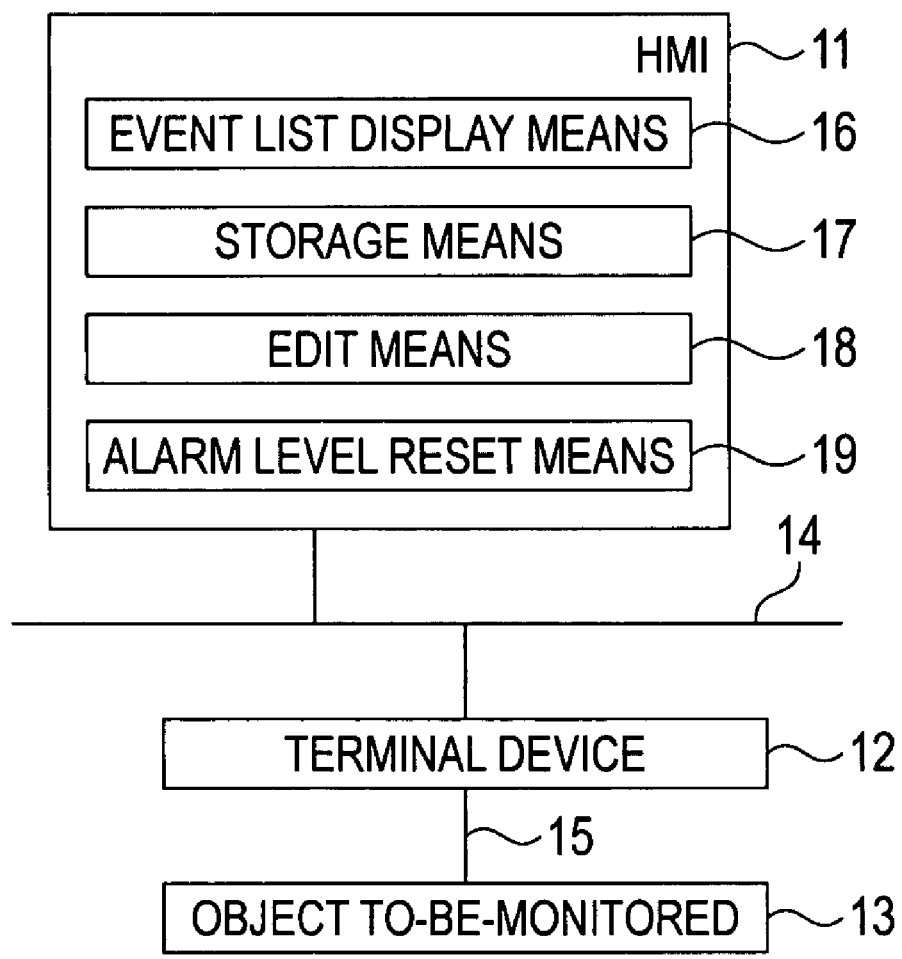
FIG. 6 is a block diagram showing a monitor control system according to Embodiment 3 of this invention.

FIG. 6 is a block diagram showing a monitor control system according to Embodiment 3 of this invention.

Referring to FIG. 6, numerals 11-18 designate the same constituents as in FIG. 5, respectively. In FIG. 6, the HMI 11 includes alarm level reset means 19 for resetting an altered content into the original state thereof when a preset time period lapses after the alteration of the content by the edit means 18.

In Embodiment 2, the content of the alarm level table 31 in FIG. 3 has been alterable at any desired timing. In addition to the alterability, Embodiment 3 is provided with the alarm level reset means 19 for recovering the altered content into the original state thereof when the preset time period lapses after the alteration of the content.

More specifically, in altering the content of the alarm level table 31, the content before the alteration is retained in the storage means 17 within the HMI 11, and timer processing is activated. Thereafter, when the preset time period lapses, the content retained in the storage means 17 is recovered in the alarm level table 31.

In this way, according to Embodiment 3, an operator can be prevented from failing to recover the altered content of the alarm level table to the original content after, for example, the end of the maintenance operation of the object to-be-monitored 13.

That is, an alarm level can be altered only in a time zone during which the maintenance or the like is performed in the object to-be-monitored, and the content of the alarm level table can be automatically recovered to the original content after the end of the operation of the maintenance or the like.

By the way, in the description of each of Embodiments 1-3, there has been exemplified the case where the alarm levels consist of the two, "attention" and "warning" levels, it can also be made with ease to give these alarm levels other names such as "level-1" and "level-2" or to set three or more alarm levels by adding "level-3" or the like.

Various modifications and alterations of this invention will be apparent to those skilled in the art without departing from the scope and spirit of this invention, and it should be understood that this invention is not limited to the illustrative embodiments set forth herein.

What is claimed is:

1. A monitor control system comprising a human machine interface that includes event list display means for displaying an event list screen of list form, in which event names and alarm levels are contained as to alarm events having occurred in an object to-be-monitored, and storage means for storing therein an alarm level table in which the alarm levels are set so as to correspond to time zones where the alarm events occur, wherein at least one alarm event in the alarm level table has a plurality of associated alarm levels that correspond to different respective time zones, and wherein when the alarm event occurs in the object to-be-monitored, said event list display means determines the alarm level corresponding to the time zone in which an occurrence time of the alarm event is contained, on the basis of the alarm level table, so as to display the determined alarm level on the event list screen, wherein said human machine interface includes edit means for altering a content of the alarm level table.

2. A monitor control system comprising:
a human machine interface that includes event list display means for displaying an event list screen of list form, in which event names and alarm levels are contained as to alarm events having occurred in an object to-be-monitored,
storage means for storing therein an alarm level table in which the alarm levels are set so as to correspond to time zones where the alarm events occur, and
edit means for altering a content of the alarm level table,
wherein said human machine interface includes alarm level reset means for resetting the content alteration of the alarm level table based on said edit means, into an original state after a preset time period has lapsed from the alteration,
wherein when the alarm event occurs in the object to-be-monitored, said event list display means determines the alarm level corresponding to the time zone in which an occurrence time of the alarm event is contained, on the basis of the alarm level table, so as to display the determined alarm level on the event list screen.

* * * * *